(12) United States Patent
Hirota

(10) Patent No.: US 8,879,942 B2
(45) Date of Patent: Nov. 4, 2014

(54) IMAGE FORMING APPARATUS

(71) Applicant: Kyocera Document Solutions Inc., Osaka (JP)

(72) Inventor: Masato Hirota, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/964,131

(22) Filed: Aug. 12, 2013

(65) Prior Publication Data

US 2014/0064771 A1    Mar. 6, 2014

(30) Foreign Application Priority Data

Aug. 29, 2012  (JP) ................................. 2012-188720

(51) Int. Cl.
*G03G 15/00* (2006.01)
*G06K 15/02* (2006.01)
*B41J 29/00* (2006.01)

(52) U.S. Cl.
CPC ................. *G06K 15/18* (2013.01); *B41J 29/00* (2013.01); *G03G 15/00* (2013.01); *G03G 15/55* (2013.01); *G03G 15/5016* (2013.01)
USPC ............................................................ 399/75

(58) Field of Classification Search
USPC ........................................................... 399/75
See application file for complete search history.

(56) References Cited

U.S. PATENT DOCUMENTS 7,742,707 B2 *  6/2010  Kawai ............................... 399/8

FOREIGN PATENT DOCUMENTS

JP            05233479 A  *  9/1993  ............. G06F 13/00
JP            H05-233479       9/1993

* cited by examiner

*Primary Examiner* — Clayton E LaBalle
*Assistant Examiner* — Warren K Fenwick

(57) ABSTRACT

In a main controller of an image forming apparatus, the status renewing-and-notifying unit (a) obtains statuses from a queue, and store status values at addresses corresponding to status IDs in a first status storage unit; (b) notifies a component of both of a objective status and a dependent status either at a same time or in a reversed time order if the statuses includes the objective status and the dependent status, and the status value of the dependent status in the first status storage unit and the status value of the dependent status in the second status storage unit are different from each other; and (c) stores a status value of each status that the component is notified of at an address corresponding to a status ID of the status in the second status storage unit at a notification timing of the status.

4 Claims, 5 Drawing Sheets

IMAGE FORMING APPARATUS

CROSS-REFERENCE TO RELATED APPLICATIONS

This application relates to and claims priority rights from a Japanese Patent Application No. 2012-188720, filed on Aug. 29, 2012, the entire disclosures of which are hereby incorporated by reference herein.

BACKGROUND

1. Field of the Disclosure

The present disclosure relates to an image forming apparatus.

2. Description of the Related Art

When an image forming apparatus is configured so that sensors detect statuses of units, notification is directly provided a notification to a component corresponding to an event of changing the detected value of the sensors, and upon receiving the notification the component starts or stops an object to be controlled or changes display of an operation panel, the configuration of the image forming apparatus is complex, and if a sensor is newly added, changed, or deleted for a new machine type, then a signal line of the notification must be added, changed, or deleted; and it results in increasing the cost.

Therefore, the configuration is adopted in which a status collective management unit receives various status changes at one part and transfers it to a main controller by serial transmission, and transmits a notification from the main controller to a corresponding component; and in development of a new machine type, in order to cope with adding, changing, or deleting a status as a notification object, the status collective management can be modified by changing its software.

However, if two statuses are changed at a substantially same time and notification receiving processes are performed in the order of receiving the notifications when notifications of them are received, then a malfunction may occur in the corresponding component.

For example, when the residual amount of paper sheets in a paper cassette reaches zero, this status is notified; and when a user pulls out the paper cassette, fills up the paper cassette with paper sheets and closes the paper cassette, the status of the cassette closing is detected. Upon this, an end of the paper sheets in the cassette is lifted and it is detected, and it is notified of changing to lifting start status (notified that paper sheets are supplied). Since a status that the paper sheet residual amount is zero and the cassette is closed arises between the cassette closing and the lifting starting, a malfunction that another substitute paper cassette is selected occurs in the paper cassette selecting component.

Therefore, when an engine controller notifies the main controller of an event of the cassette closing, the main controller requests a current lifting status (a status dependent on an open/close status of the cassette) from the engine controller, and if the response indicates lifting is started, the main controller notifies the corresponding component of this status either earlier than or at the same time of the notification that the cassette is closed. Consequently, the aforementioned malfunction is prevented.

However, the main controller must perform such inquiry to the engine controller every time when the main controller receives a predetermined event. In the collective management, relatively many statuses, e.g. 180 statuses exist as notification objects and the notification is performed with the serial transmission to reduce the number of signal lines, and therefore, traffic congestion tends to occur in communication between the controllers and the inquiry results in further traffic congestion and a bottleneck.

SUMMARY

An image forming apparatus according to an aspect of the present disclosure includes: a sub controller configured to transmit a notification of an event of a status change; and a main controller configured to receive the notification. The main controller comprises: a queue configured to store a status that includes a status ID and a status value in the notification on the basis of the notification; a first status storage unit; a second status storage unit; and a status renewing-and-notifying unit. The status renewing-and-notifying unit is configured to (a) obtain statuses from the queue in turn, temporarily memorize the statuses, and store the status values at addresses corresponding to the status IDs in the first status storage unit; (b1) notify a component corresponding to an objective status among the temporarily memorized statuses of the objective status and a dependent status dependent on the objective status either at a same time or in a reversed time order if the temporarily memorized statuses includes the objective status and the dependent status, and the status value of the dependent status in the first status storage unit and the status value of the dependent status in the second status storage unit are different from each other; (b2) notify the component of the objective status if the temporarily memorized statuses does not include any dependent statuses dependent on the objective status or if the temporarily memorized statuses includes a dependent status but the status value of the dependent status in the first status storage unit and the status value of the dependent status in the second status storage unit are identical to each other; and (c) store the status value of the status that the component is notified of at an address corresponding to the status ID of the status in the second status storage unit at a notification timing of the status.

These and other objects, features and advantages of the present disclosure will become more apparent upon reading of the following detailed description along with the accompanied drawings.

DETAILED DESCRIPTION

Embodiment 1

Figure 1:
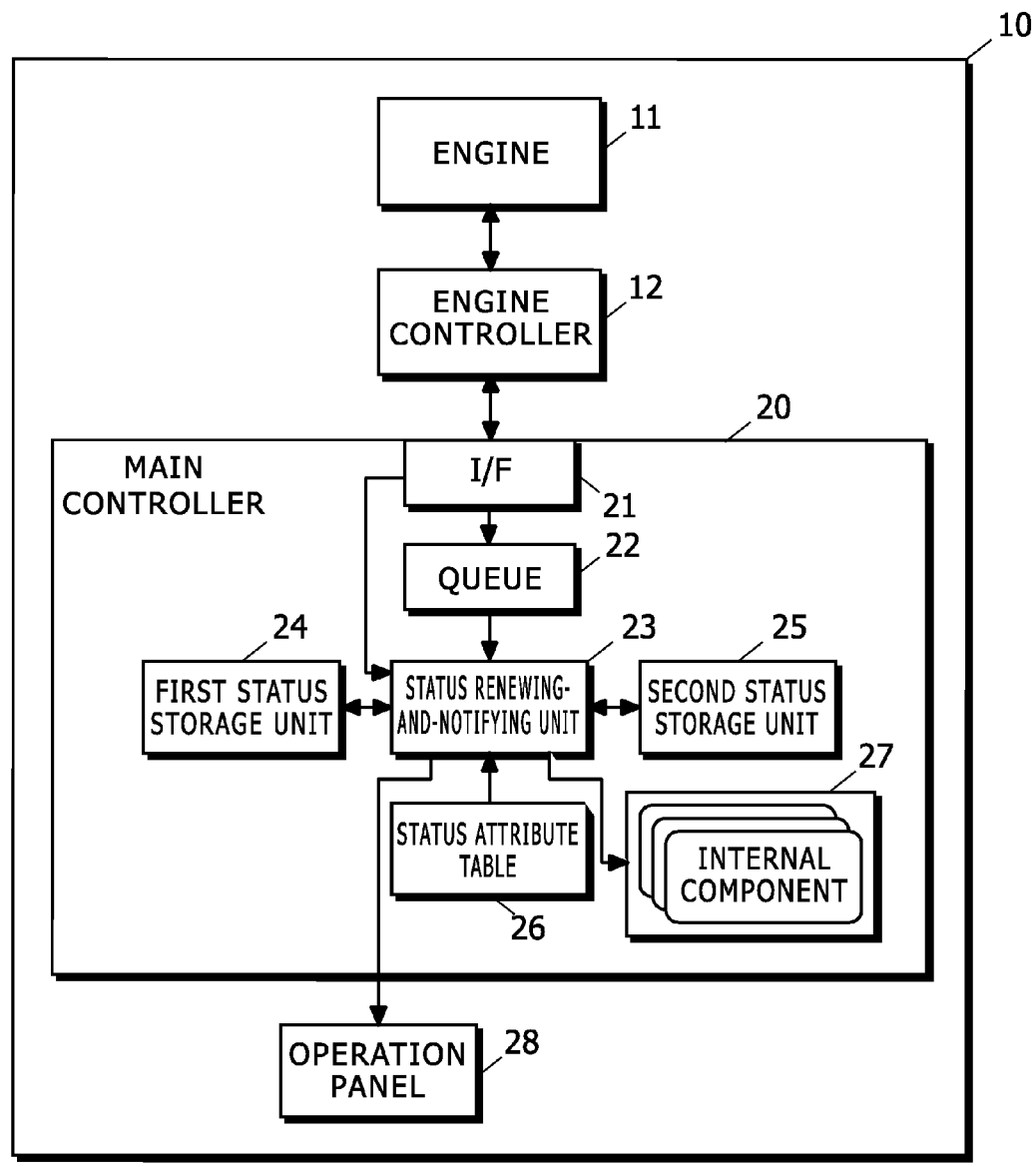
FIG. 1 shows a schematic functional block diagram of event notification in an image forming apparatus of Embodiment 1 of the present disclosure.

FIG. 1 shows a schematic functional block diagram of event notification in an image forming apparatus 10.

An engine 11 includes a print engine, a paper feeding unit, a paper transporting unit, and a paper output unit, receives bitmap data generated in a memory, forms an electrostatic latent image on a photo conductor drum on the basis of this data, performs development for this image with toner, transfers and fixes the toner image on a paper sheet, and outputs the paper sheet. The engine 11 also includes lots of status output units such as sensors and counters, and provides respective output signals from them to an engine controller 12 as a sub controller.

The engine controller 12 identifies a status ID (e.g. of 2 bytes) corresponding to a type of each signal among the signals and identifies a value (e.g. of 1 byte) of the signal as a status value, and temporarily memorizes a couple of the status ID and the status value as a status. If the status value is changed, the engine controller 12 transmits the status of which the status value has been changed as an event to a main controller 20 by serial transmission.

The main controller 20 parallelizes serial values received by a serial communication interface 21 and stores, for example, each 3 bytes of the parallelized serial values as a status into a queue 22 in turn. The serial communication interface 21 interrupts a status renewing-and-notifying unit 23 when the serial reception is finished and storing to the queue 22 is finished.

The status renewing-and-notifying unit 23 includes a storage unit in which a program and data are stored, and a processor that acts according to the program, and the aforementioned interruption is an interruption to this processor.

Here the i-th status from the output part of the queue 22 is described as "ST(i)", and a status ID and a status value of it are described as "ST(i).ID" and "ST(i).V" respectively.

There are two types of the status value, one is an integer value such as a last page of which the output has been finished, a residual amount of paper sheets in a paper cassette (in percentage), a residual toner amount (in percentage), and the other is a flag array; and for example, in the flag array the 0-th bit indicates whether or not the top cover of the main body is opened, the second bit indicates whether or not the side cover of the main body is opened, and so forth.

Figure 2A:
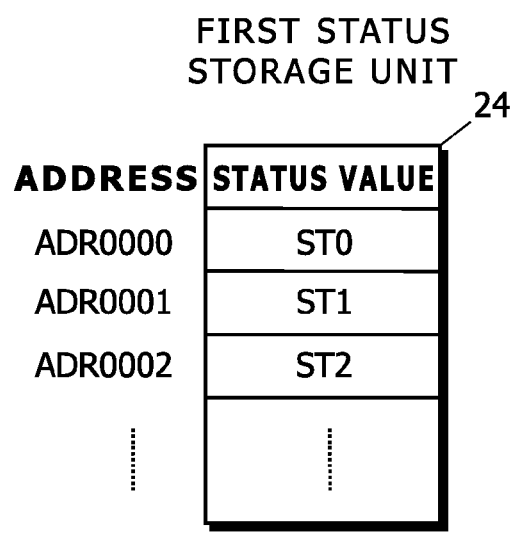
FIG. 2A and FIG. 2B show diagrams for explanation of a relationship between addresses and status values in the first status storage unit 24 and the second status storage unit 25 shown in FIG. 1.
Figure 2B:
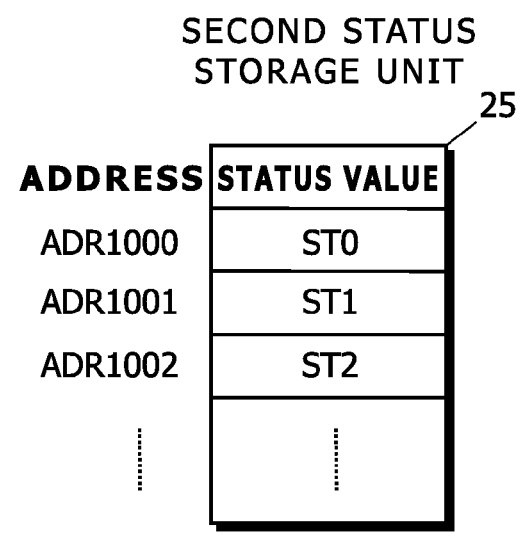

As shown in FIG. 2A, in a first status storage unit 24, a status value STi is stored at an address corresponding to a status ID (e.g. an address ADR0i=ADR0000+the status ID); and as well, as shown in FIG. 2B, in a second status storage unit 25, a status value STi is stored at an address corresponding to a status ID (e.g. an address ADR1i=ADR1000+the status ID).

Figure 3:
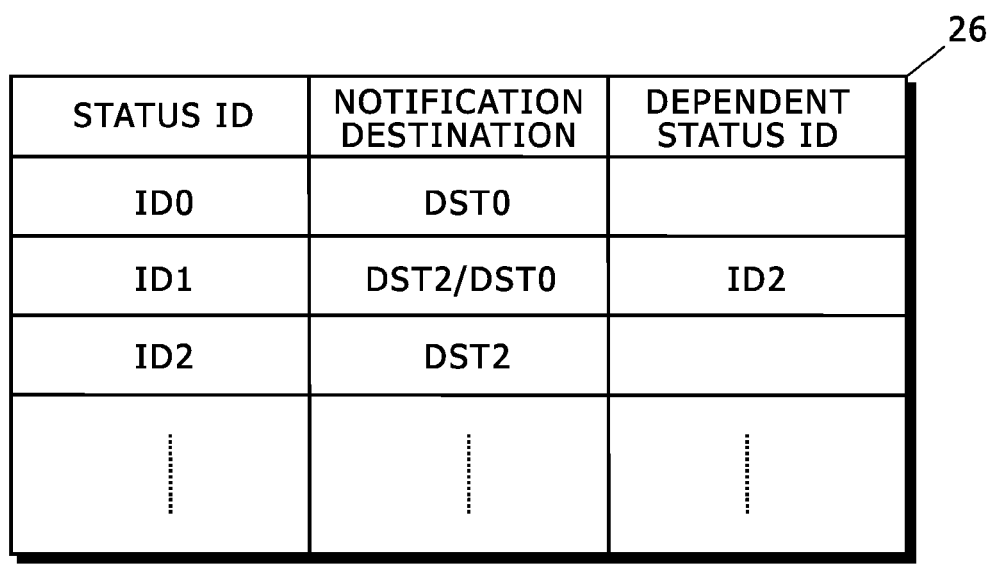
FIG. 3 shows a configuration diagram of the status attribute table 26 shown in FIG. 1.

Further, in a status attribute table 26 shown in FIG. 1, as shown in FIG. 3, for each status ID, a notification destination identification DST is stored, and if the status of the status ID is dependent on a status of another status ID, this other status ID is also stored. FIG. 3 shows that the destinations of the status ID1 are DST2 and DST0 and the status ID1 is dependent on the status ID2. In FIG. 3, "/" is a delimiter symbol used when plural destinations are set, and specifically the plural destinations has a link structure and sequentially linked with a link. Further, a blank field of the dependent status ID indicates no dependent status IDs.

Here "a status A depends on a status B" means that a series of statuses received (statuses received in a same time period) from the engine controller 12 by serial communication includes the status A and the status B, and the status renewing-and-notifying unit 23 must notify a notification destination of the status B earlier than the status A in order to prevent a malfunction of the notification destination.

The notification destination is a software component or a hardware component among internal components 27 or an operation panel 28.

Figure 4:
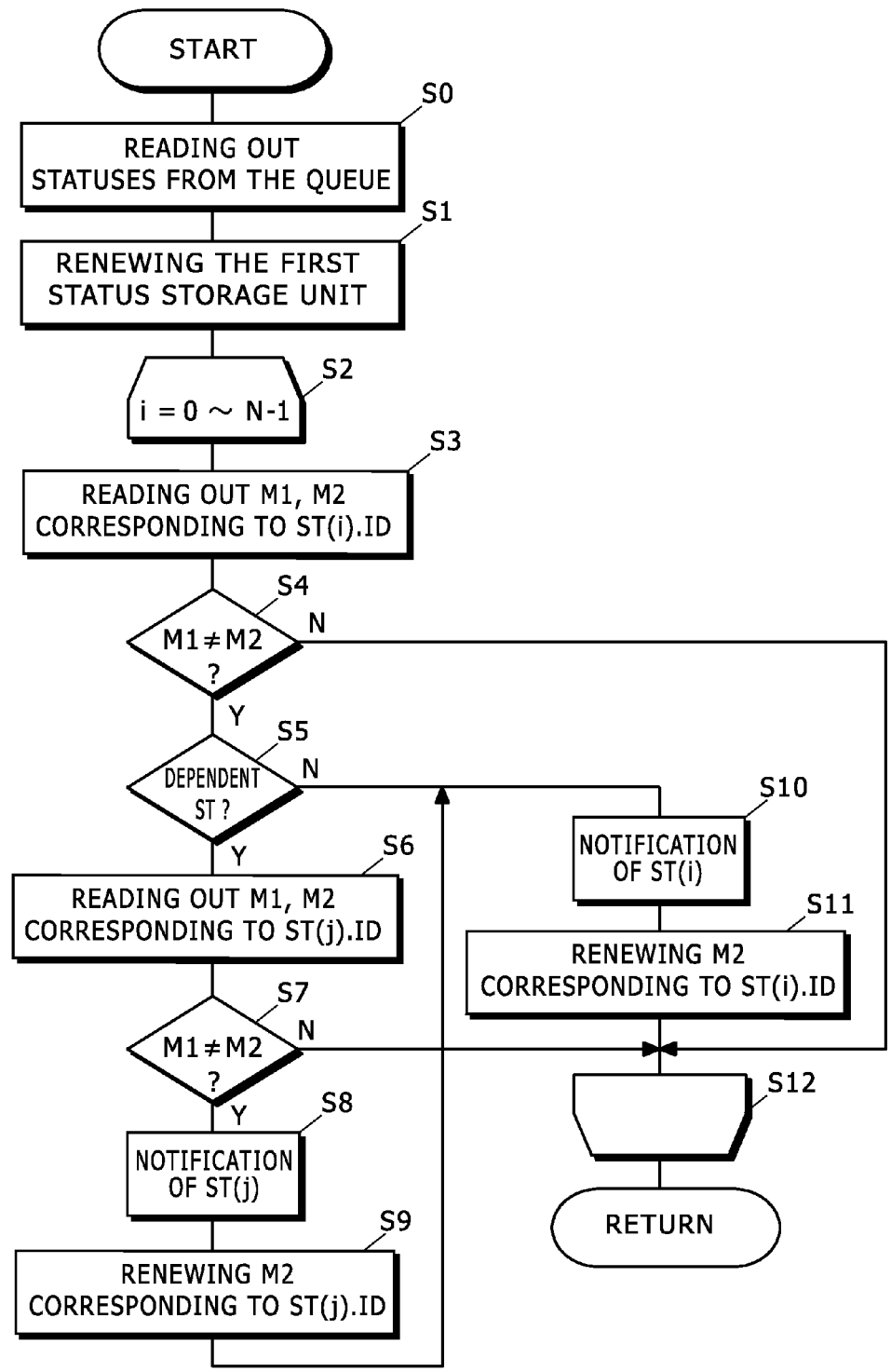
FIG. 4 shows a schematic flowchart that indicates a process performed by the status renewing-and-notifying unit 23 shown in FIG. 1.

FIG. 4 shows a schematic flowchart that indicates a process performed by the status renewing-and-notifying unit shown in FIG. 1. This process is started by the aforementioned interruption from the serial communication interface 21.

(Step S0) The status renewing-and-notifying unit 23 obtains statuses from the queue 22 in turn, and stores them in an array ST(i). The number of the statuses in the queue 22 is N, and i=0, . . . , N−1.

(Step S1) For each i, the status renewing-and-notifying unit 23 stores ST(i).V to an address corresponding to ST(i).ID in the first status storage unit 24 to renew statuses stored in the first status storage unit 24.

(Step S2) The initial value of i is zero and the value of i is increased by 1 every time when returning to Step S2 from Step S12; and if i<N, the status renewing-and-notifying unit 23 proceeds to Step S3, otherwise the process shown in FIG. 4 is terminated.

(Step S3) The status renewing-and-notifying unit 23 reads out a status value as M1 from an address corresponding to ST(i).ID in the first status storage unit 24, and reads out a status value as M2 from an address corresponding to ST(i).ID in the second status storage unit 25.

(Step S4) If M1 and M2 are not identical to each other, that is, if the status is changed or statuses in the second status storage unit 25 have been renewed in the loop process of Steps S2 to S12 (i.e. the notification of this status has been performed), then the status renewing-and-notifying unit 23 proceeds to Step S5, otherwise the status renewing-and-notifying unit 23 proceeds to Step S12.

(Step S5) The status renewing-and-notifying unit 23 refers to the status attribute table 26; and if there is a status ID dependent on this ST(i).ID and the dependent status ID is identical to any of ST(j).ID for i<j<N, then the status renewing-and-notifying unit 23 proceeds to Step S6, otherwise the status renewing-and-notifying unit 23 proceeds to Step S10. Even if the dependent status ID is identical to any of ST(j).ID for 0<j<i, the process of the dependent status ID must be performed before ST(i).ID, and therefore no problems arise.

(Step S6) The status renewing-and-notifying unit 23 reads out a status value as M1 from an address corresponding to ST(j).ID in the first status storage unit 24, and reads out a status value as M2 from an address corresponding to ST(j).ID in the second status storage unit 25.

(Step S7) If M1 and M2 are not identical to each other, that is, if the status is changed, then the status renewing-and-notifying unit 23 proceeds to Step S8, otherwise the status renewing-and-notifying unit 23 proceeds to Step S12.

(Step S8) The status renewing-and-notifying unit 23 refers to the status attribute table 26 to identify a notification destination of ST(j).ID and notifies the destination of ST(j).

(Step S9) The status renewing-and-notifying unit 23 writes ST(j).V to an address corresponding to ST(j).ID in the second status storage unit 25 to renew the status.

(Step S10) The status renewing-and-notifying unit 23 refers to the status attribute table 26 to identify a notification destination of ST(i).ID and notifies the destination of ST(i).

(Step S11) The status renewing-and-notifying unit 23 writes ST(i).V to an address corresponding to ST(i).ID in the second status storage unit 25 to renew the status.

(Step S12) The status renewing-and-notifying unit 23 returns to Step S2.

In the aforementioned Embodiment 1, the main controller 20 obtains a status from the queue 22, and is not required to inquire for a status dependent on the obtained status to the engine controller 12, and therefore, the traffic congestion due to notifications is reduced even though the number of statuses as notification objects from the engine controller 12 to the main controller 20 is large and these notifications are performed with serial transmission.

Further, additional processes are not required after notifying a corresponding component of an objective status and a dependent status on the objective status in a reverse time order, such as deleting the status for which the notification has been performed and rearranging statuses for which the notification has not been performed without a blank, or attaching a mark to the status for which the notification has been performed, and therefore, the process is simplified.

Embodiment 2

In Embodiment 1, if a status dependent on an objective status exists among status received in a same time period, then the notification time order of the objective status and the dependent status is reversed. Alternatively, if a component which receives the notifications (e.g. an operation panel) is capable of determining its own action so as to prevent a malfunction when receiving the notifications of both of the statuses at the same time, it is possible to notify the component of both of the statuses at once and at the same time. Embodiment 2 handles such a case.

Figure 5:
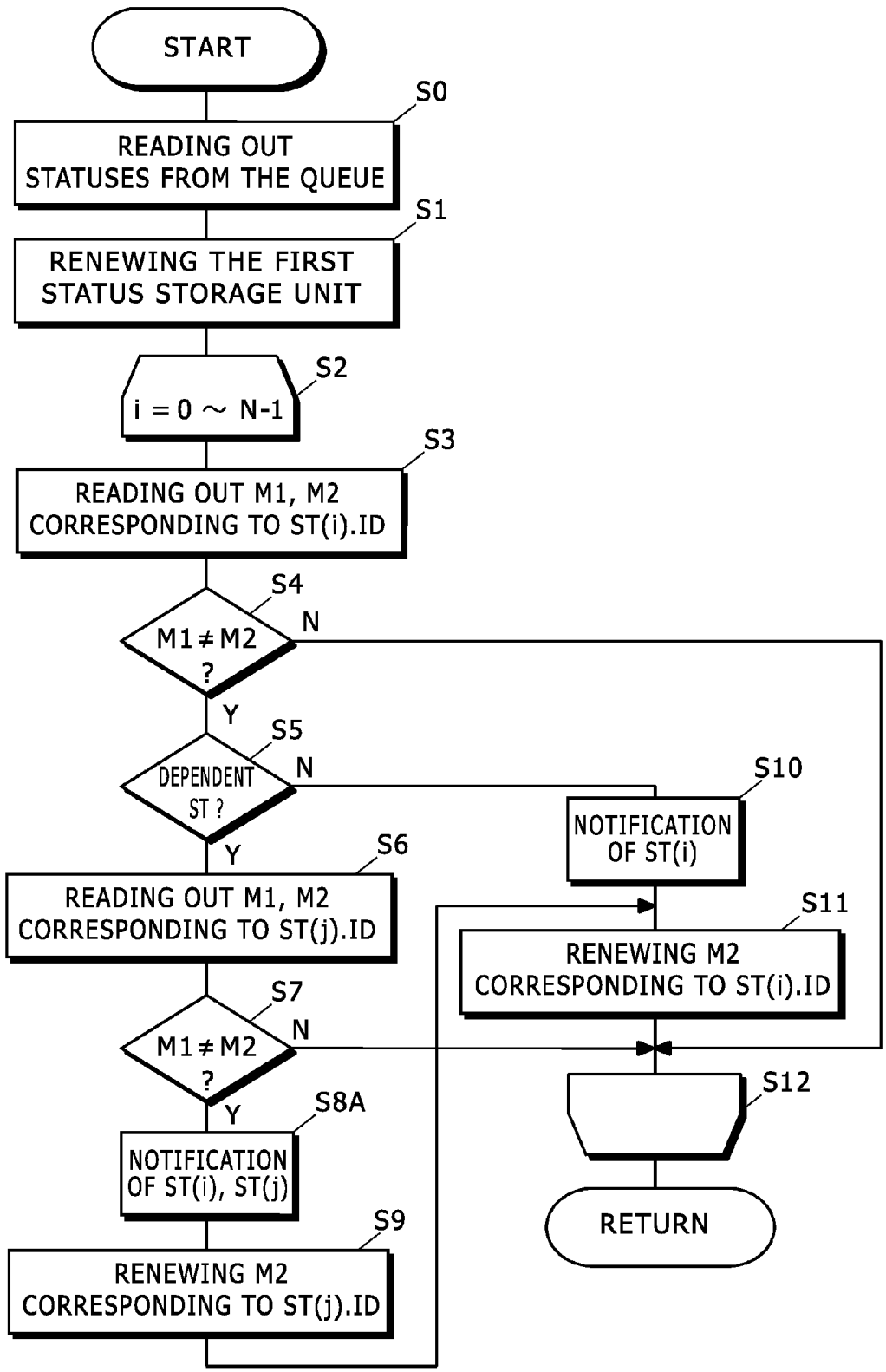
FIG. 5 shows a schematic flowchart that indicates a process performed by the status renewing-and-notifying unit 23 in Embodiment 2 of the present disclosure.

FIG. 5 shows a schematic flowchart that indicates a process performed by the status renewing-and-notifying unit 23 in such a case.

The different point from FIG. 4 is that in Step S8A the notification destination component is notified of the objective status and the dependent status at the same time, and the status renewing-and-notifying unit 23 proceeds via Step S9 to Step S11. The other parts are identical to those in Embodiment 1.

In Embodiment 2, the same advantage is achieved as that of Embodiment 1.

The description has been presented for purposes of illustration and description, and is not intended to be exhaustive or limited to the invention.

For example, it may be configured so that the process shown in FIG. 4 or FIG. 5 is started by an interruption from an interval timer with a time interval, e.g. 20 msec, instead of the interruption from the serial communication interface 21. Further, it may be configured so that the engine is divided into plural parts, and the plural parts transmit notifications of events via respective sub controllers corresponding to the plural parts to the main controller 20.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
    a sub controller configured to transmit a notification of an event of a status change; and
    a main controller configured to receive the notification;
    wherein the main controller comprises:
        a queue configured to store a status that includes a status ID and a status value in the notification on the basis of the notification;
        a first status storage unit;
        a second status storage unit; and
        a status renewing-and-notifying unit configured to:
            (a) obtain statuses from the queue in turn, temporarily memorize the statuses, and store the status values at addresses corresponding to the status IDs in the first status storage unit;
            (b1) notify a component corresponding to an objective status among the temporarily memorized statuses of the objective status and a dependent status dependent on the objective status either at a same time or in a reversed time order if the temporarily memorized statuses includes the objective status and the dependent status, and the status value of the dependent status in the first status storage unit and the status value of the dependent status in the second status storage unit are different from each other;
            (b2) notify the component of the objective status if the temporarily memorized statuses does not include any dependent statuses dependent on the objective status or if the temporarily memorized statuses includes a dependent status but the status value of the dependent status in the first status storage unit and the status value of the dependent status in the second status storage unit are identical to each other; and
            (c) store the status value of the status that the component is notified of at an address corresponding to the status ID of the status in the second status storage unit at a notification timing of the status.

2. The image forming apparatus according to claim 1, wherein the sub controller is a print engine controller.

3. The image forming apparatus according to claim 1, wherein the component corresponding to the objective status is a component inside of the main controller.

4. The image forming apparatus according to claim 1 further comprising an operation panel, wherein the component corresponding to the objective status is an operation panel.

* * * * *